(12) United States Patent  
Yokotani et al.

(10) Patent No.: US 6,819,101 B2  
(45) Date of Patent: Nov. 16, 2004

(54) MAGNETIC DETECTOR (75) Inventors: Masahiro Yokotani, Tokyo (JP); Izuru Shinjo, Tokyo (JP); Noriaki Hayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/422,782

(22) Filed: Apr. 25, 2003

(65) Prior Publication Data

US 2004/0027712 A1 Feb. 12, 2004

(30) Foreign Application Priority Data

Aug. 7, 2002 (JP) ........................................ 2002-230121

(51) Int. Cl.$^7$ ................................................ G01B 7/30
(52) U.S. Cl. ............................. 324/207.25; 324/207.22
(58) Field of Search ....................... 324/207.13, 207.21, 324/207.22, 207.23, 207.25; 123/612, 617

(56) References Cited

U.S. PATENT DOCUMENTS 6,239,595 B1 * 5/2001 Shinjo et al. ................ 324/252  
6,392,407 B1 * 5/2002 Mishiro et al. ......... 324/207.19  
2003/0150835 A1 * 8/2003 Ju et al. ........................ 216/22

FOREIGN PATENT DOCUMENTS

JP  9-159684 A  6/1997

* cited by examiner

Primary Examiner—Bot LeDynh  
(74) Attorney, Agent, or Firm—Sughrue Mion, PLLC (57) ABSTRACT A magnetic detector includes a moving body which is multipole-magnetized and which is rotated synchronously with a rotational axis; a magnetic resistance element for detecting a change in magnetic field of the rotating moving body; a processing circuit portion for outputting a signal corresponding to the multipole magnetization of the moving body in accordance with the change in resistance value of the magnetic resistance element due to the change in magnetic field; and a magnet for applying a bias magnetic field to the magnetic resistance element.

3 Claims, 9 Drawing Sheets

MAGNETIC MOVING BODY 1

FIG. 6B
PRIOR ART

MAGNETIC FIELD APPLIED TO SEGMENTS 2a, 2d

MAGNETIC FIELD APPLIED TO SEGMENTS 2b, 2c

FIG. 6C
PRIOR ART

RESISTANCE VALUES OF SEGMENTS 2b, 2c

RESISTANCE VALUES OF SEGMENTS 2a, 2d

FIG. 6D
PRIOR ART

OUTPUT OF DIFFERENTIAL AMPLIFICATION CIRCUIT

FINAL OUTPUT

MOVING BODY 10

FIG. 9B
PRIOR ART

MAGNETIC FIELD APPLIED TO SEGMENTS 2a, 2d

MAGNETIC FIELD APPLIED TO SEGMENTS 2b, 2c

FIG. 9C
PRIOR ART

RESISTANCE VALUES OF SEGMENTS 2b, 2c

RESISTANCE VALUES OF SEGMENTS 2a, 2d

FIG. 9D
PRIOR ART

OUTPUT OF DIFFERENTIAL AMPLIFICATION CIRCUIT ⎯⎯⎯⎯⎯⎯⎯⎯⎯⎯⎯⎯

FIG. 9E
PRIOR ART

FINAL OUTPUT ⎯⎯⎯⎯⎯⎯⎯⎯⎯⎯⎯⎯

MAGNETIC DETECTOR

BACKGROUND OF THE INVENTION

1. Field of the Invention

The present invention relates to a magnetic detector for applying a bias magnetic field to the magnetic resistance element in detecting a multipole-magnetized moving body with a magnetic resistance element (MR element).

2. Description of the Related Art

For example, there is the system wherein electrodes are respectively formed in ends of each of magnetic resistance segments constituting a magnetic resistance element to construct a bridge circuit, and a power source with constant voltage and current is connected between the two opposite electrodes of the bridge circuit to convert a change in resistance value of the magnetic resistance segment into a change in voltage, thereby detecting a change in magnetic field acting on the magnetic resistance element.

Figure 4A:
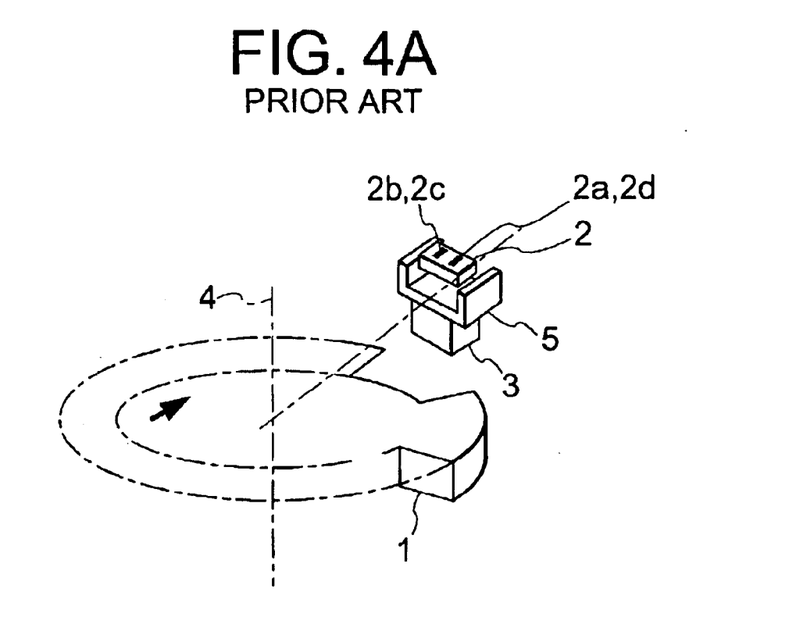
FIGS. 4A and 4B are respectively a perspective view and a plan view each showing a construction of a conventional magnetic detector.
Figure 4B:
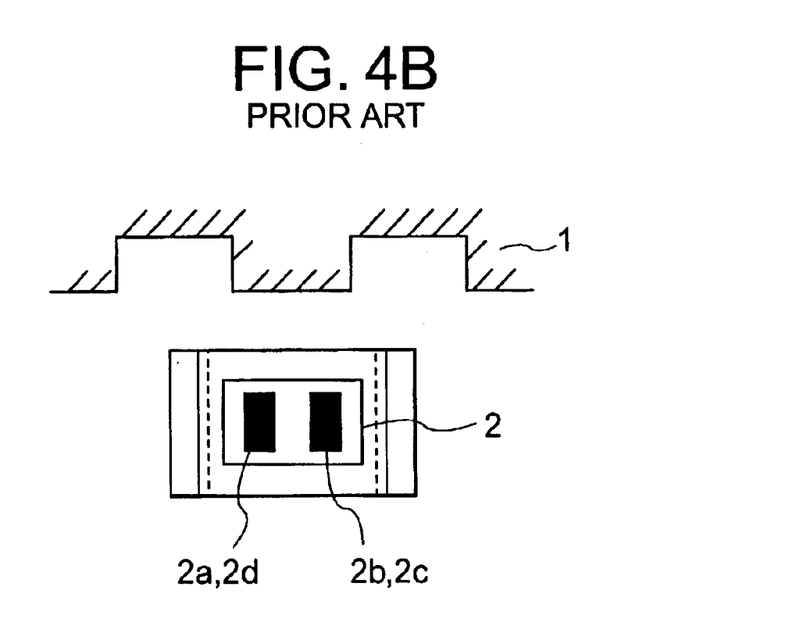

A conventional magnetic detector will now be described with reference to the associated ones of the accompanying drawings. FIGS. 4A and 4B are respectively a perspective view and a plan view each showing a construction of the conventional magnetic detector.

In FIGS. 4A and 4B, reference numeral 1 designates a disc-like magnetic moving body having projections in its periphery and having a shape for changing a magnetic field; reference numeral 2 designates a processing circuit portion in which a circuit is printed on the surface of a board; reference numerals 2a and 2d designate respectively magnetic resistance segments; reference numerals 2b and 2c designate respectively magnetic resistance segments; reference numeral 3 designates a magnet; and reference numeral 4 designates a rotational axis of the magnetic moving body 1. The rotational axis 4 is rotated so that the magnetic moving body 1 is also rotated synchronously therewith. Incidentally, for example, the magnetic resistance segments 2a and 2d are illustrated by one black block because the individual segments are so compacted that one segment can not be illustrated independently.

Figure 5:
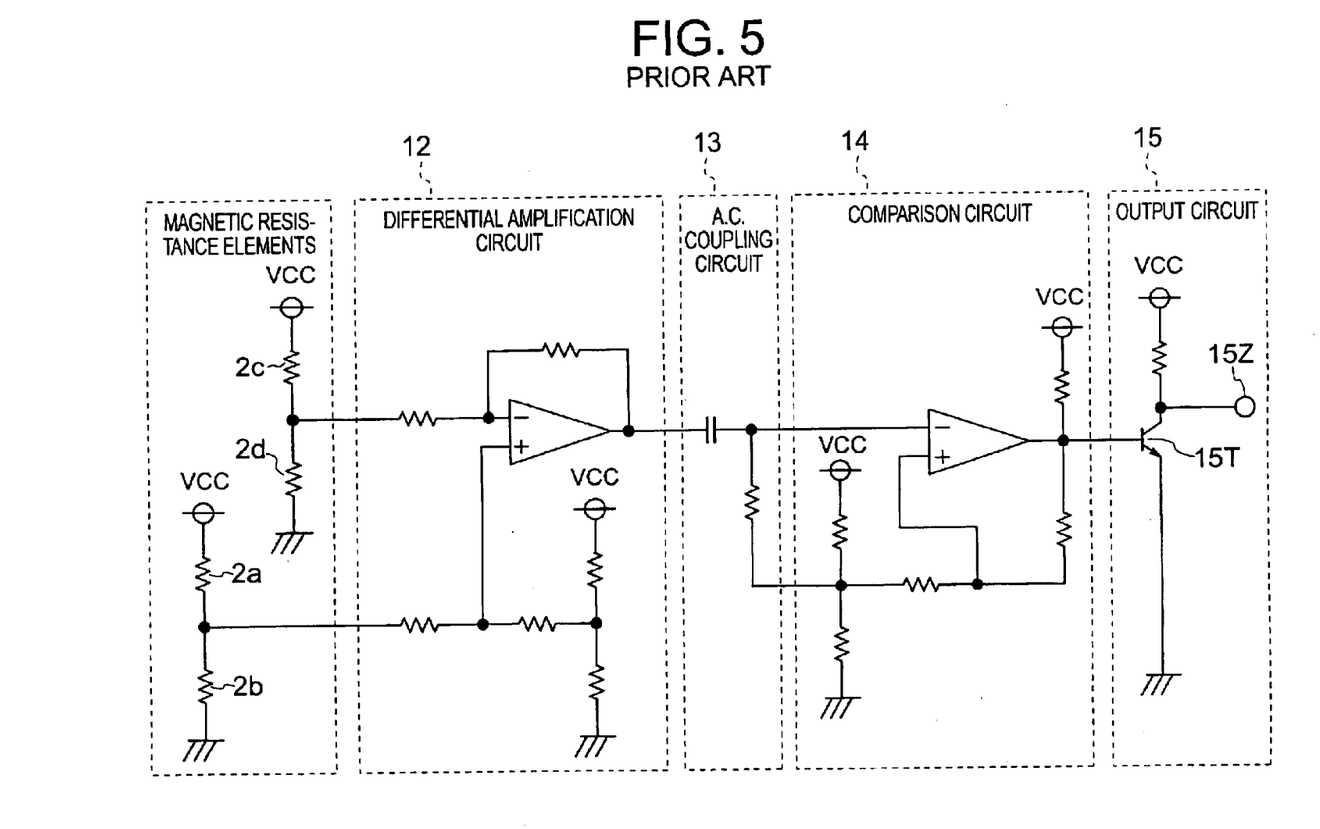
FIG. 5 is a circuit diagram showing a construction of a processing circuit portion of the conventional magnetic detector.

FIG. 5 is a circuit diagram showing a construction of the processing circuit portion of the conventional magnetic detector employing a magnetic resistance element.

In FIG. 5, the magnetic resistance element is constituted by the magnetic resistance segments 2a to 2d. Also, in the figure, reference numeral 12 designates a differential amplification circuit, reference numeral 13 designates an A. C. coupling circuit, reference numeral 14 designates a comparison circuit, reference numeral 15 designates an output circuit, reference symbol 15T designates a transistor, and reference symbol 15Z designates an output terminal.

In FIG. 5, a constant voltage VCC is applied to the bridge circuit constituted by the magnetic resistance segments 2a to 2d or fixed resistors to convert the changes in resistance values of the magnetic resistance segments 2a to 2d due to the change in magnetic field into a voltage change. The signal which has been obtained by the conversion into the voltage change is amplified by the amplification circuit 12 to be inputted to the comparison circuit 14 through the A. C. coupling circuit 13. The signal a level of which has been compared with a predetermined voltage by the comparison circuit 14 is converted into a final output signal having a level of "0" or "1" (=VCC) by the transistor 15T in the output circuit 15 to be outputted from the output terminal 15Z.

Figure 6A:
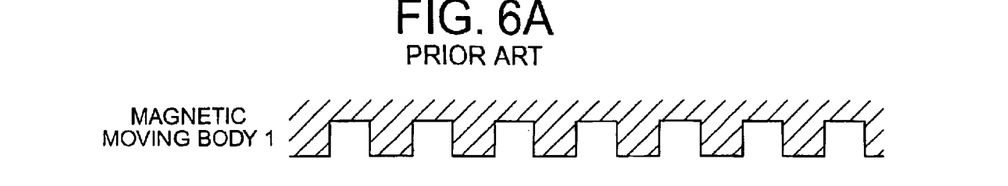
FIGS. 6A to 6E are timing charts showing the operation of the conventional magnetic detector.
Figure 6B:
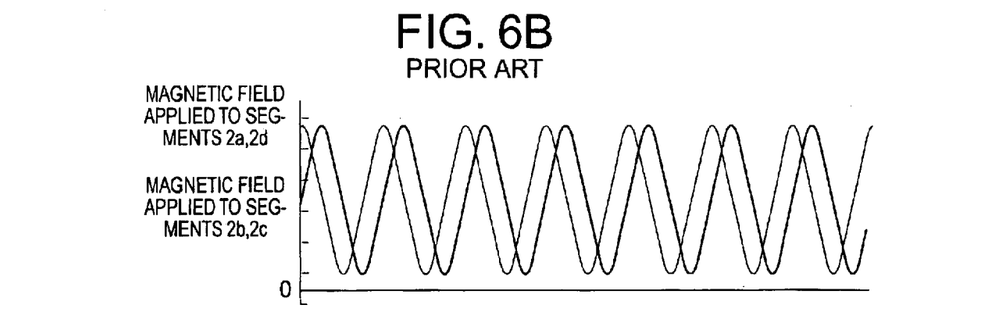
Figure 6C:
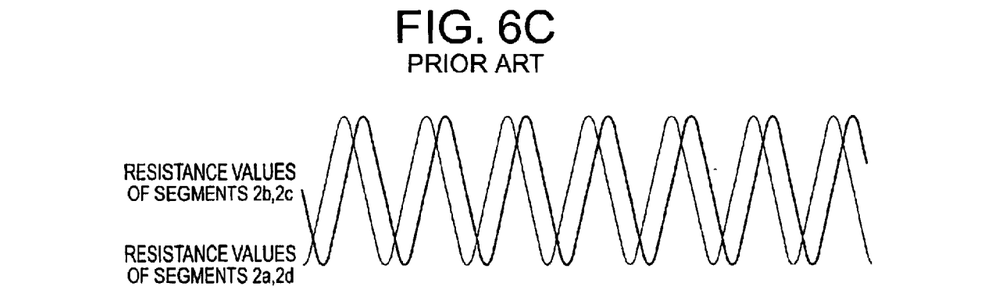
Figure 6D:
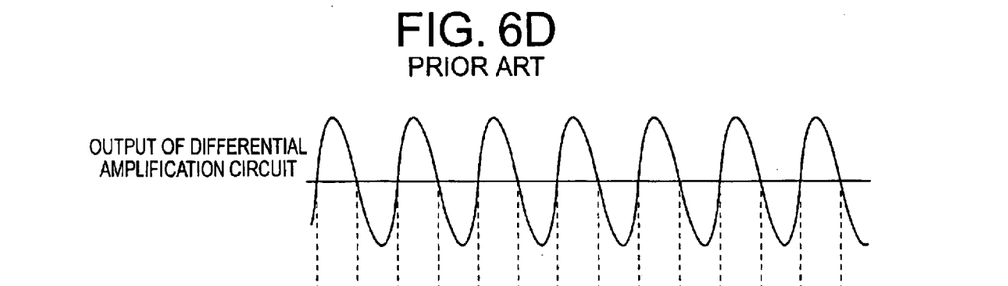
Figure 6E:
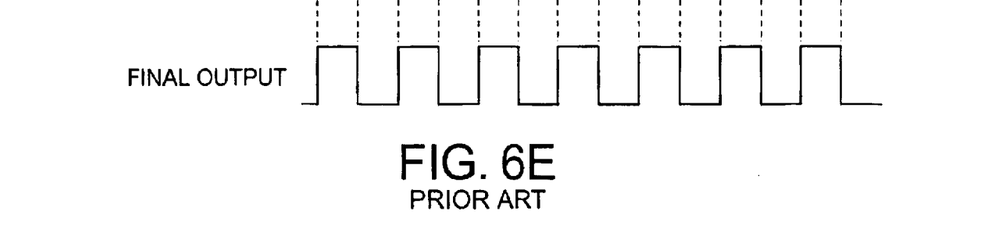

Next, the operation of the conventional magnetic detector will be described with reference to FIGS. 6A to 6E. FIGS. 6A to 6E are timing charts showing the operation of the conventional magnetic detector. In FIGS. 6A to 6E, FIG. 6A shows the magnetic moving body 1, FIG. 6B shows magnetic fields applied to the magnetic resistance segments 2a, 2b, 2c and 2d, respectively, FIG. 6C shows resistance values of the magnetic resistance segments 2a to 2d, FIG. 6D shows an output signal of the differential amplification circuit 12, and FIG. 6E shows a final output signal.

The magnetic moving body 1 shown in FIGS. 4A and 4B is rotated about the rotational axis 4 to change the magnetic fields applied to the magnetic resistance segments 2a, 2b, 2c and 2d. Thus, as shown in FIGS. 6A and 6B, the magnetic fields applied to the magnetic resistance segments 2a to 2d are changed according to the shape of the magnetic moving body 1.

Furthermore, as shown in FIGS. 6C and 6D, the resistance values of the magnetic resistance segments 2a to 2d are changed due to the change in magnetic field, thereby obtaining the output signal of the differential amplification circuit 12. Then, as shown in FIG. 6E, the waveform of the output signal of the differential amplification circuit 12 is shaped by the comparison circuit 14, thereby being capable of obtaining the final output signal having the level "1" or "0" corresponding to the shape of the magnetic moving body 1.

In recent years, there has been made the demand for high resolution for realizing high performance even in magnetic detectors. However, the restrictions on the irregularity pitch for minimum detection, and the shape and processing of the magnetic moving body 1 in magnetic detectors place limitation on realizing the high resolution with the increase of the number of irregularities of the magnetic moving body 1.

Figure 7A:
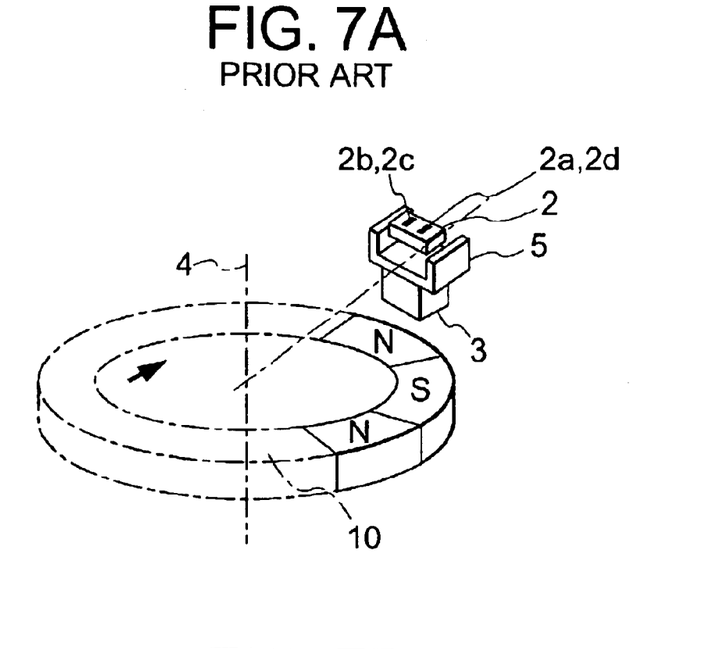
FIGS. 7A and 7B are respectively a perspective view and a plan view each showing a construction of another conventional magnetic detector.
Figure 7B:
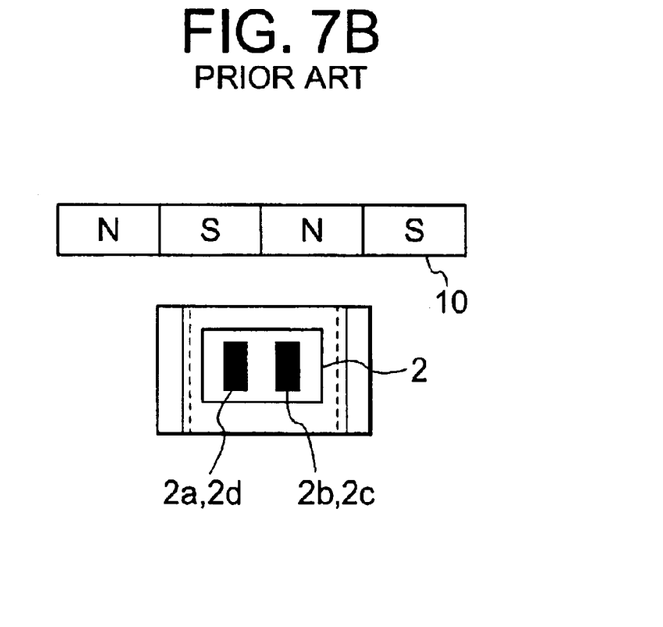

Then, as an effective method for realizing the high resolution, there is a method of detecting a multipole-magnetized moving body as shown in FIGS. 7A and 7B.

FIGS. 7A and 7B are respectively a perspective view and a plan view each showing a construction of another conventional magnetic detector.

In FIGS. 7A and 7B, reference numeral 10 designates a multipole-magnetized moving body; reference numeral 2 designates a processing circuit portion in which a circuit is printed on a board; reference numerals 2a and 2d designate respectively magnetic resistance segments; reference numerals 2b and 2c designate respectively magnetic resistance segments; reference numeral 3 designates a magnet; and reference numeral 4 designates a rotational axis of the moving body 10. The rotational axis 4 is rotated so that the moving body 10 is also rotated synchronously therewith. Incidentally, for example, the magnetic resistance segments 2a and 2d are illustrated by one black block because the individual segments are so compacted that one segment can not be illustrated independently.

FIGS. 9A to 9E are timing charts showing the operation of another conventional magnetic detector shown in FIGS.

Figure 9A:
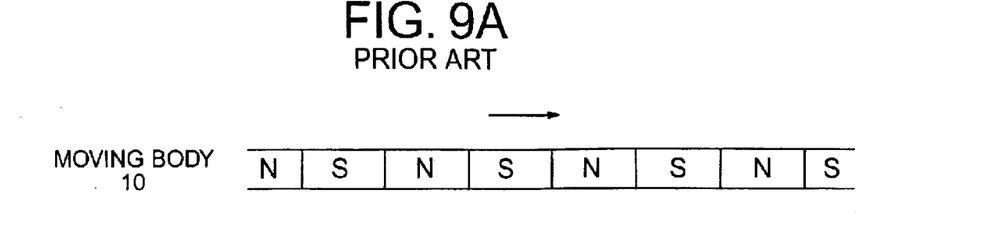
FIGS. 9A to 9E are timing charts showing the operation of another conventional magnetic detector.
Figure 9B:
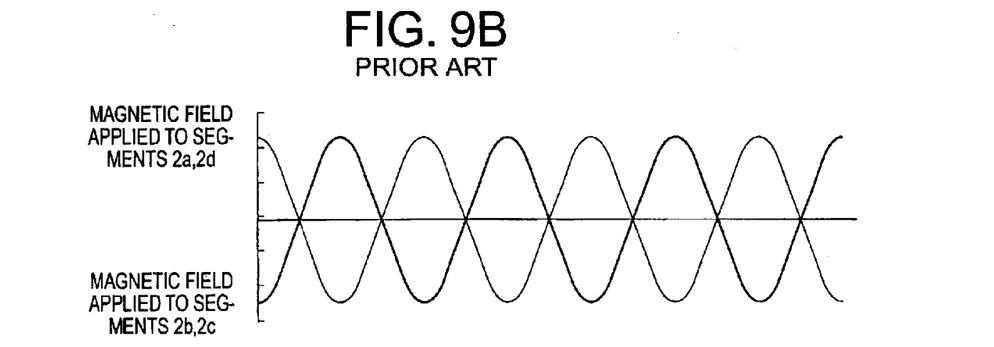
Figure 9C:
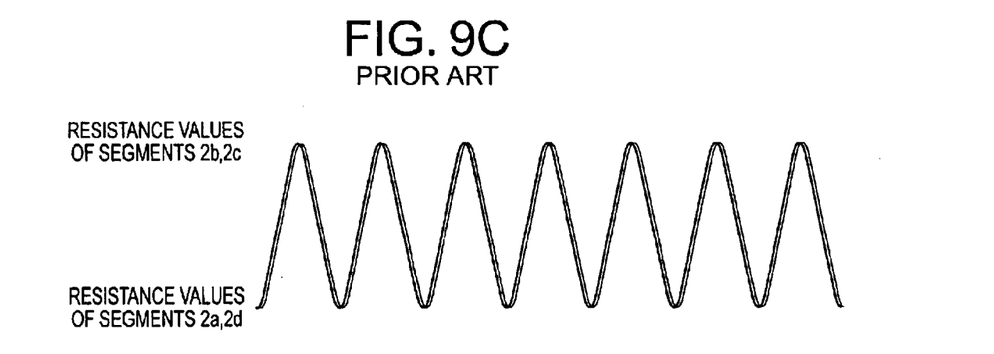
Figure 9D:
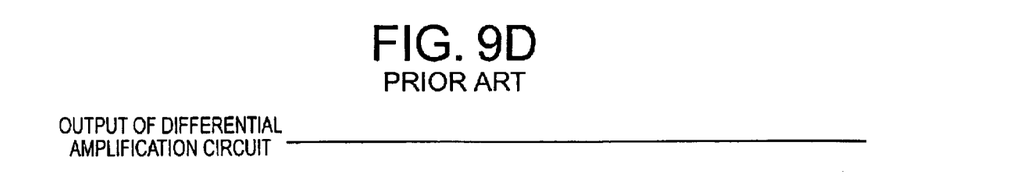
Figure 9E:
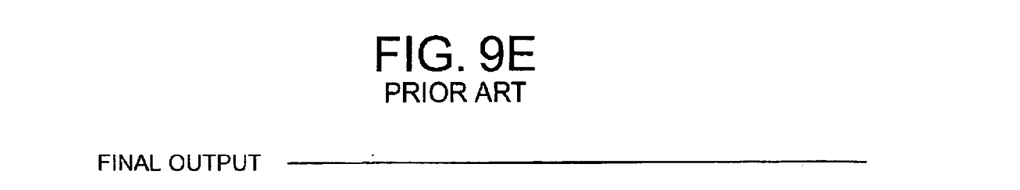

7A and 7B. In FIGS. 9A to 9E, FIG. 9A shows the moving body 10, FIG. 9B shows the magnetic fields applied to the magnetic resistance segments 2a, 2b, 2c and 2d, respectively, FIG. 9C shows the resistance values of the magnetic resistance segments 2a to 2d, FIG. 9D shows an output signal of the differential amplification circuit 12, and FIG. 9E shows a final output signal.

Figure 8:
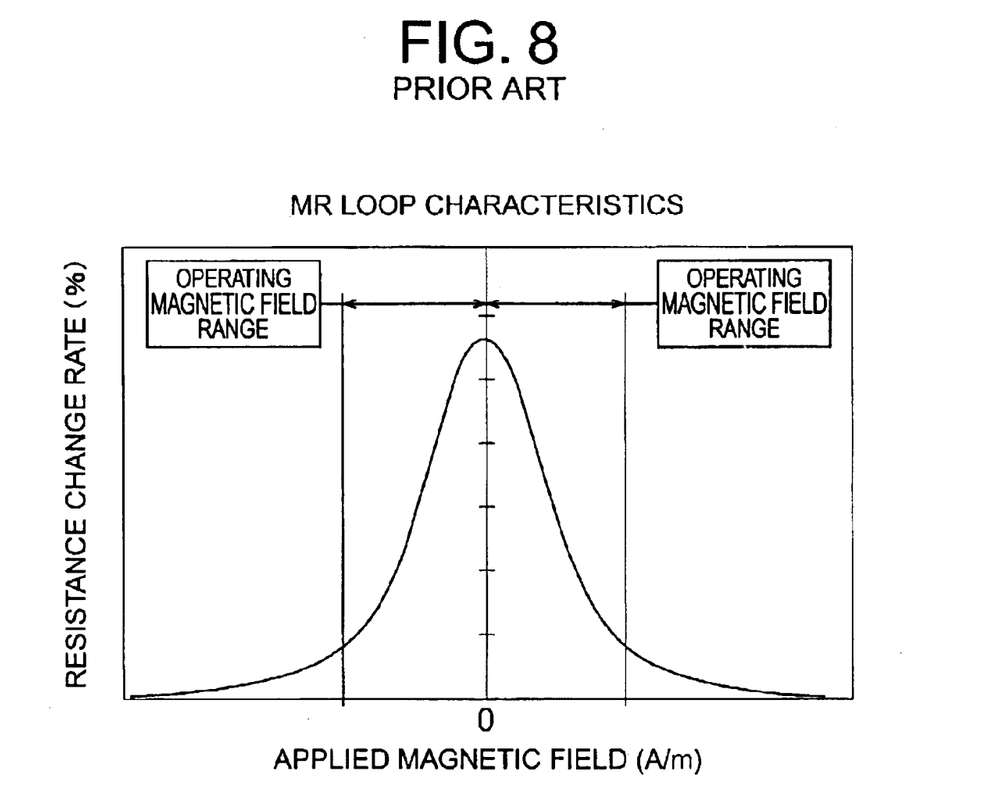
FIG. 8 is a graphical representation showing the operating magnetic field range (MR loop characteristics) of a magnetic resistance element of the conventional magnetic detector.

Now, the operating magnetic field range of the magnetic resistance element (constituted by the magnetic resistance segments 2a to 2d) becomes a problem. FIG. 8 is a graphical representation showing the operating magnetic field (MR loop characteristics) of the magnetic resistance element. In FIG. 8, the axis of abscissa represents the applied magnetic field (A/m), and the axis of ordinate represents the resistance change rate (%).

As shown in FIG. 8, since the resistance value (resistance change rate) of the magnetic resistance element becomes maximum with no magnetic field (applied magnetic field being zero) is applied thereto (when the magnitude of the applied magnetic field is zero), and decreases by application of the magnetic field irrespective of the direction, it is necessary to set the operating magnetic field range without crossing no magnetic field (zero magnetic field).

In the case of the conventional magnetic detector firstly described, the magnetic fields applied to the magnetic resistance element (constituted by the magnetic resistance segments 2a to 2d) are as shown in FIG. 6B. That is to say, the magnetic circuit is constructed such that when the magnetic resistance element faces the recess portion of the magnetic moving body 1, the nearly zero magnetic field is applied thereto, while when it faces the projection portion, the magnetic field is applied thereto.

For this reason, when detecting the multipole-magnetized moving body 11 as shown in FIGS. 7A and 7B which was secondly described, the magnetic fields applied to the magnetic resistance segments 2a to 2d will cross the zero magnetic field as shown in FIG. 9B. As a result, there has been a problem in that the magnetic resistance segments 2a, 2d and 2b, 2c show the similar resistance value change as shown in FIGS. 9C to 9E so that the output of the differential amplification circuit 12 is not obtained and moreover, the final output signal is not obtained.

SUMMARY OF THE INVENTION

In the light of the foregoing, the present invention has been made in order to solve the above-described problems associated with the prior art, and it is, therefore, an object of the present invention to provide a magnetic detector in which application of a bias magnetic field to a magnetic resistance element can prevent the magnetic field applied to the magnetic resistance element from crossing the zero magnetic field, and further, a multipole-magnetized moving body can be detected with high accuracy.

The present invention relates to a magnetic detector which includes a moving body, a magnetic resistance element, a processing circuit portion, and a magnet. The moving body is multipole-magnetized and rotated synchronously with a rotational axis. The magnetic resistance element detects a change in magnetic field of the rotating moving body. The processing circuit portion outputs a signal corresponding to the multipole magnetization of the moving body in accordance with the change in resistance value of the magnetic resistance element due to the change in magnetic field. The magnet applies a bias magnetic field to the magnetic resistance element. As a result, there is obtained an effect such that the magnetic field applied to the magnetic resistance element can be prevented from crossing the zero magnetic field, and thus, satisfactory detection can be detected.

BRIEF DESCRIPTION OF THE DRAWINGS

The foregoing and other objects are effected by the invention as will be apparent from the following description and claims taken in connection with the accompanying drawings, forming a part of this application, in which:

DETAILED DESCRIPTION OF THE PREFERRED EMBODIMENTS

First Embodiment

Figure 1A:
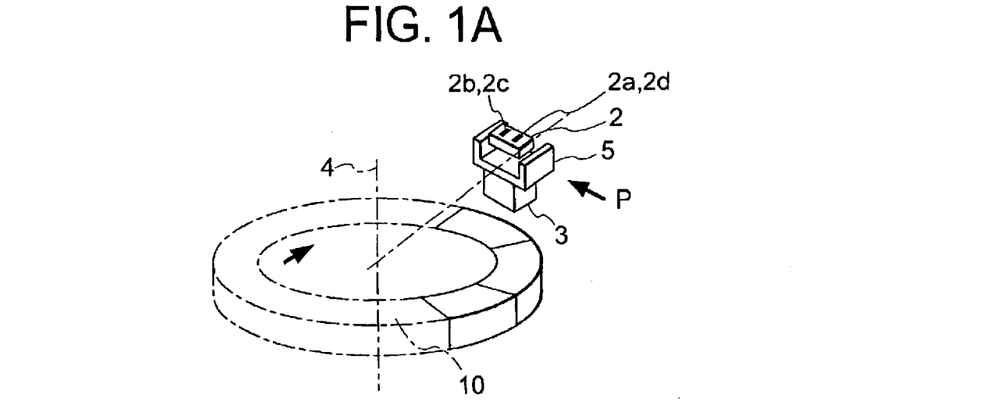
FIG. 1A is a perspective view showing a construction of a magnetic detector according to a first embodiment of the present invention.
Figure 1B:
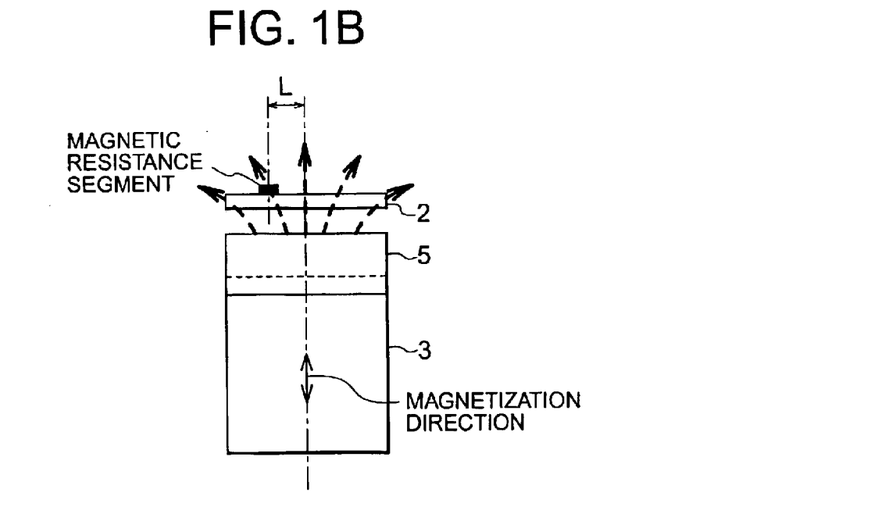
FIG. 1B is a view when viewed from a view point P of the perspective view of FIG. 1A.
Figure 1C:
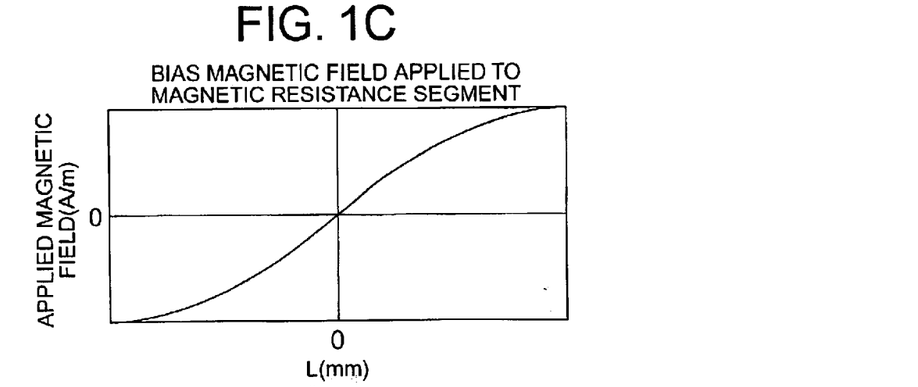
FIG. 1C is a graphical representation of a characteristic diagram showing the relationship between a distance L and a bias magnetic field.

A magnetic detector according to a first embodiment of the present invention will hereinafter be described in detail with reference to the associated ones of the accompanying drawings. FIGS. 1A to 1C are respectively views showing a construction and the like of a magnetic detector according to the first embodiment of the present invention. In addition, FIGS. 2A to 2E are timing charts showing the operation of the magnetic detector according to the first embodiment of the present invention. Incidentally, in these drawings, the same or corresponding portions are designated by the same reference numerals.

In FIGS. 1A to 1C, FIG. 1A is a perspective view, FIG. 1B is a view when viewed from a view point P of FIG. 1A, and FIG. 1C is a graphical representation of a characteristic diagram showing the relationship between a distance L and a bias magnetic field applied to a magnetic resistance segment.

In FIG. 1A, reference numeral 10 designates a multipole-magnetized moving body; reference numeral 2 designates a processing circuit portion in which a circuit is printed on the surface of a board; referenced numerals 2a and 2d designate respectively magnetic resistance segments; reference numerals 2b and 2c designate respectively magnetic resistance segments; reference numeral 3 designates a magnet; reference numeral 4 designates a rotational axis of the moving body 10; and reference numeral 5 designates a magnetic substance guide. The rotational axis 4 is rotated so that the movable 10 is also rotated synchronously therewith. Incidentally, for example, the magnetic resistance segments 2a and 2d are illustrated by one black block because the individual segments are so compacted that one segment can not be illustrated independently.

In FIG. 1B, the magnetic resistance segments 2a to 2d (constituting a magnetic resistance element) are provided on the processing circuit portion 2 on the side of the moving body 10 so as to be a distance L away from the central line (which is parallel to the rotational axis 4) in the magnetization direction of the magnet 3. In addition, the magnetic resistance elements may also be provided on the processing circuit portion 2 on the opposite side of the moving body 10 a predetermined distance away from the central axis of the magnet 3. Dotted lines containing respective arrows represent the magnetic field of the magnet 3. Incidentally, in the prior art examples shown in FIGS. 4A and 4B and FIGS. 7A and 7B, the magnetic resistance element is provided on the processing circuit portion 2 on the central axis of the magnet 3.

In FIG. 1C, the axis of abscissa represents a distance L (mm), and the axis of ordinate represents the applied magnetic field (bias magnetic field) (A/m).

As shown in FIGS. 1B and 1C, in the magnetic circuit of the magnetic detector according to the first embodiment, it is possible to adjust suitable bias magnetic fields for the magnetic resistance segments according to the distance L from the central line of the magnet 3.

Figure 2A:
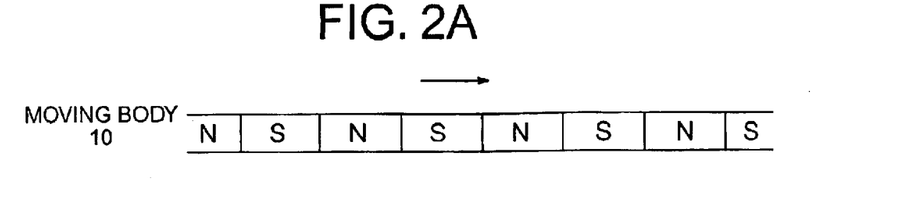
FIGS. 2A to 2E are timing charts showing the operation of the magnetic detector according to the first embodiment of the present invention.
Figure 2B:
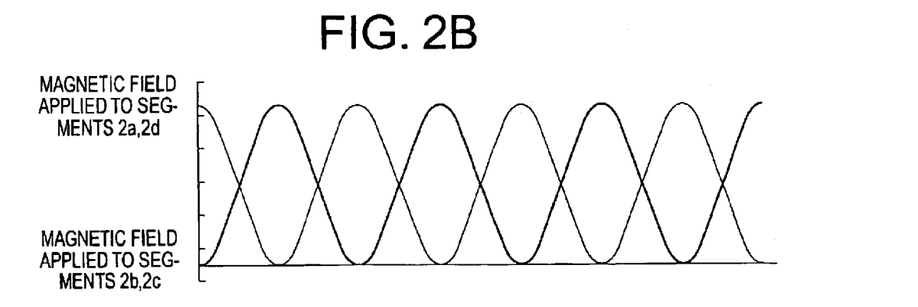
Figure 2C:
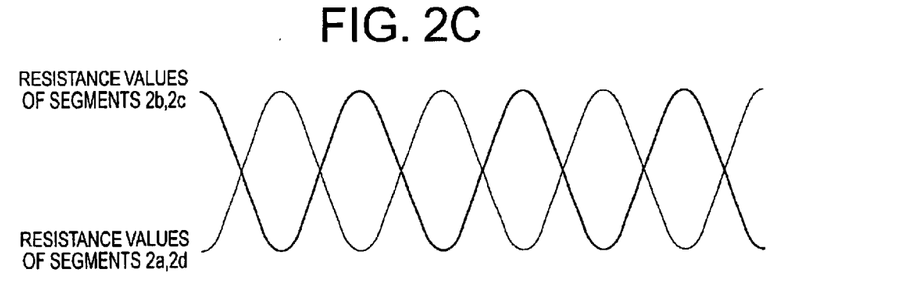
Figure 2D:
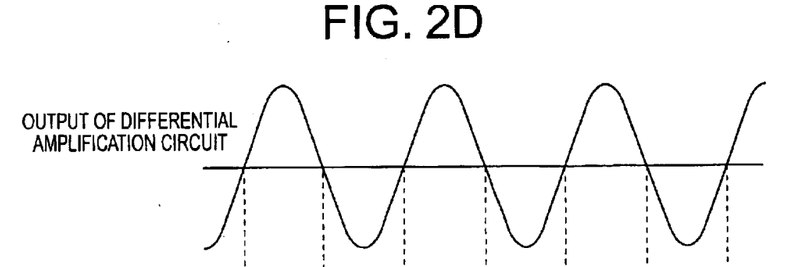
Figure 2E:
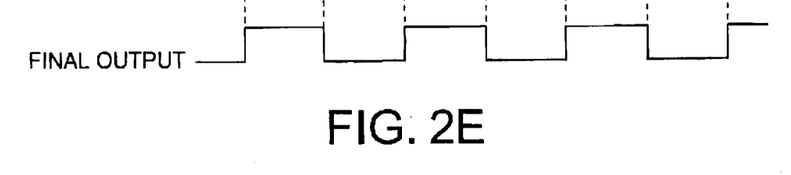

FIGS. 2A to 2E are timing charts showing the operation of the magnetic detector according to the first embodiment of the present invention. In FIGS. 2A to 2E, FIG. 2A shows the moving body 1, FIG. 2B shows magnetic fields applied to the magnetic resistance segments 2a, 2b, 2c and 2d, respectively, FIG. 2C shows resistance values of the magnetic resistance segments 2a to 2d, FIG. 2D shows an output signal of the differential amplification circuit 12 and FIG. 2E shows a final output signal.

As shown in FIGS. 2A and 2E, it is possible to obtain the signal corresponding to the multipole magnetization of the moving body 10 (final output signal).

Second Embodiment

A second embodiment is such that the strength of each of the bias magnetic fields applied to the magnetic resistance segments (constituting the magnetic resistance element) in the above-described first embodiment is made equal to or larger than that of each of the magnetic fields applied from the moving body 10 to the magnetic resistance segments, or the maximum magnetic field strength.

Subsequently, the change in each of the magnetic fields applied to the magnetic resistance segments does not cross the zero magnetic field at all, and an excellent signal (final output) can be obtained.

Third Embodiment

A third embodiment is such that a giant magnetic resistance element (hereinafter, referred to as "GMR element") is employed as a magnetic resistance element.

The GMR element is a lamination body which is obtained by alternately laminating a magnetic layer and a non-magnetic layer each having a thickness of several Å to several tens Å, i.e., the so-called artificial lattice film. As examples of such artificial lattice films, (Fe/Cr)n, (permalloy/Cu/Co/Cu)n, and (Co/Cu)n are known. Incidentally, n denotes the number of lamination.

The GMR element has much larger MR effect (MR change rate) than that of a magnetic resistance element (MR element) and also its MR effect depends only on the relative angle between the directions of magnetizations of adjacent magnetic layers. Hence, this GMR element is the in-plane magnetic sensitive element in which the same resistance change can be obtained independent of what angle difference the direction of the external magnetic field has with respect to a current.

But, the GMR element is also the element for which anisotropy can be provided by narrowing a width of a magnetic resistance pattern narrow.

In addition, the GMR element is the element in which the hysteresis is present in the change in resistance value due to the change in applied magnetic field, and also the temperature characteristics, in particular, the large temperature coefficient can be obtained.

Figure 3:
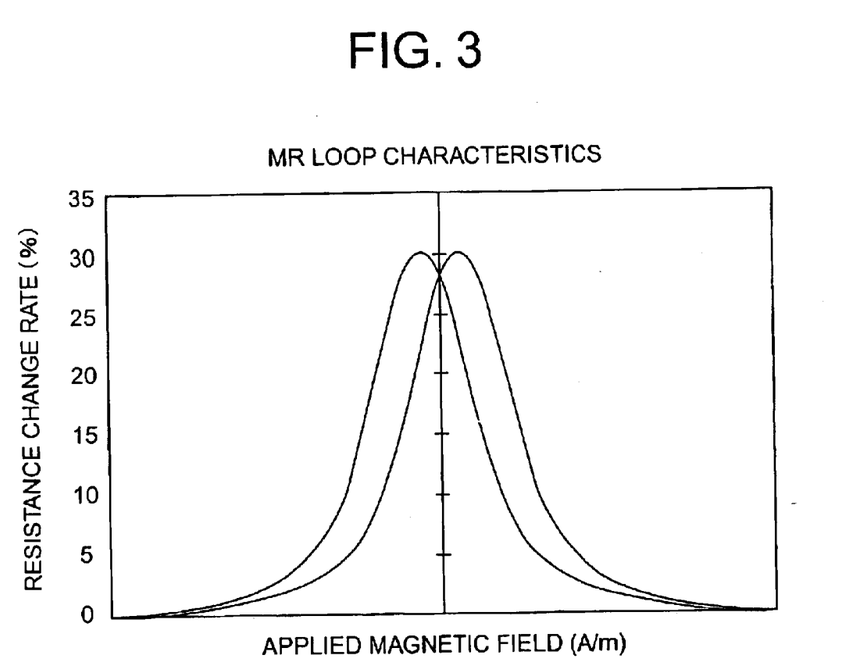
FIG. 3 is a graphical representation of MR loop characteristics of a GMR element of a magnetic detector according to a third embodiment of the present invention.

FIG. 3 is a graphical representation of MR loop characteristics of the GMR element of a magnetic detector according to the third embodiment of the present invention.

In FIG. 3, the axis of abscissa represents the applied magnetic field (A/m), and the axis of ordinate represents the resistance change rate (%).

In such a manner, the use of the GMR element as the magnetic resistance element can increase the anti-noise resistance as well as enhance the S/N ratio.

As many apparently widely different embodiments of this invention may be made without departing from the spirit and scope thereof, it is to be understood that the invention is not limited to the specific embodiments thereof except as defined in the appended claims.

What is claimed is:

1. A magnetic detector, comprising:
   a moving body which is multipole-magnetized and which is rotated synchronously with a rotational axis;
   a magnetic resistance element for detecting a change in magnetic field of said rotating moving body;
   a processing circuit portion for outputting a signal corresponding to the multipole magnetization of said moving body in accordance with the change in resistance value of said magnetic resistance element due to the change in magnetic field;
   a magnet for applying a bias magnetic field to said magnetic resistance element; and
   wherein the strength of the bias magnetic field applied from said magnet to said magnetic resistance element is larger than that of the magnetic field applied from said moving body to said magnetic resistance element.

2. A magnetic detector, comprising:

a moving body which is multipole-magnetized and which is rotated synchronously with a rotational axis;

a magnetic resistance element for detecting a change in magnetic field of said rotating moving body;

a processing circuit portion for outputting a signal corresponding to the multipole magnetization of said moving body in accordance with the change in resistance value of said magnetic resistance element due to the change in magnetic field;

a magnet for applying a bias magnetic field to said magnetic resistance element;

wherein the strength of the bias magnetic field applied from said magnet to said magnetic resistance element is larger than that of the magnetic field applied from said moving body to said magnetic resistance element; and wherein said processing circuit portion is provided on the magnetization direction of said magnet, and said magnetic resistance element is provided on said processing circuit portion so as to be a predetermined distance apart from the central line of the magnetization direction of said magnet.

3. A magnetic detector, comprising:

a moving body which is multipole-magnetized and which is rotated synchronously with a rotational axis;

a magnetic resistance element for detecting a change in magnetic field of said rotating moving body;

a processing circuit portion for outputting a signal corresponding to the multipole magnetization of said moving body in accordance with the change in resistance value of said magnetic resistance element due to the change in magnetic field;

a magnet for applying a bias magnetic field to said magnetic resistance element;

wherein the strength of the bias magnetic field applied from said magnet to said magnetic resistance element is larger than that of the magnetic field applied from said moving body to said magnetic resistance element;

wherein said processing circuit portion is provided on the magnetization direction of said magnet, and said magnetic resistance element is provided on said processing circuit portion so as to be a predetermined distance apart from the central line of the magnetization direction of said magnet; and wherein the direction of the predetermined distance toward said magnetic resistance element is on the side of said moving body.

* * * * *